April 18, 1939.  J. H. VAN UUM  2,154,712

SELF-LOCKING SECURING DEVICE

Filed March 22, 1937

INVENTOR.
JOHN H. VAN UUM
BY
*John H. Leonard,*
ATTORNEY.

Patented Apr. 18, 1939

2,154,712

UNITED STATES PATENT OFFICE 2,154,712

SELF-LOCKING SECURING DEVICE

John H. Van Uum, Lakewood, Ohio

Application March 22, 1937, Serial No. 132,263

3 Claims. (Cl. 85—5)

This invention relates to spring clip devices for securing a plurality of elements together in firm juxtaposition and more particularly to a device of this general character to be used in a combination including an element to be supported and a supporting element, at least one of the elements having an aperture, for securing and positively locking the elements together by the cooperative relation between the parts of the device, the elements, the aperture, and the wall of the apertured element adjacent the aperture.

Heretofore, spring clip devices of this nature have been used extensively in securing panelling, bead trim strips, weather stripping, and similar elements to automobile bodies, refrigerators and other devices, and the problems present in this connection are well known.

Such spring clip devices usually include a shank comprising a nose portion with leg portions integral therewith, the leg portions terminating in a head, the nose and leg portions being forced through the aperture of the supporting member and the head portion connected to the member to be supported. The prior devices, however, are of such construction and design that inadvertent detachment of the elements secured thereby is not uncommon even under normal operating conditions. Experience has proven that the failures of prior devices have occurred due to inherent defects in their design.

Therefore, one of the principal objects of the present invention is to provide a spring clip of this general character having its shank portion so constructed and designed that it is easily and readily inserted into the aperture of an associated element, supplemental resilient locking or gripping fingers being provided on the shank which compress during insertion of the shank into the aperture and thereafter expand and contact the aperture defining wall of the element engaged and yieldably urge the elements into firm juxtaposition and permanently lock them against movement.

A correlative and more specific object is to provide the supplemental gripping fingers so shaped as to compensate for various thicknesses of the member engaged by the shank and irregularities in the aperture defining wall caused by the usual drilling burrs and the like.

Another object is to provide a clip which may be inserted through a relatively much smaller aperture in relation to the expanded size of the clip than clips heretofore provided so that a more firm and positive locking engagement of the clip with the supporting structure is provided and a tendency for the clip to rock in the support in any direction is greatly reduced.

Another object is to provide a clip of this general character formed of a single integral flat strip of resilient metal which is self-centering and self-locking with respect to the support and aperture, in such a manner that it is impossible for it to be moved in any direction, and one in which the spring action of the device is so effective that dislodgement, loosening, or separation from the support is rendered impossible except by manual compression of the locking portions from the opposite side of the supporting member.

In so forming such a clip it is another object of the present invention to achieve simplicity, cheapness of manufacture, and efficiency of operation, and to this end a single flat strip of spring metal is formed into the device by a simple, single punch or forming operation.

Other objects and advantages will become apparent from the following specification wherein reference is made to the drawing, in which.

For the purposes of illustration, but without intent to limit the invention to the specific form illustrated, a preferred embodiment of the present invention is disclosed and comprises a plain flat spring metal strip having a portion forming a generally V-shaped nose with leg portions extending therefrom and terminating in separate flat head portions which are engageable with one of the elements, the use of this type of head portion for cooperation with specific types of elements being readily apparent therefrom.

As mentioned in the objects, panelling, bead trim strips, weather stripping, and the like, often become dislodged or loosened inadvertently from the supporting member. Economy and modern production methods require that the above mentioned elements not only be securely locked in firm juxtaposition with the supporting member but also that the spring clip retaining device and the elements to be secured be rapidly and easily installed.

Figure 1:
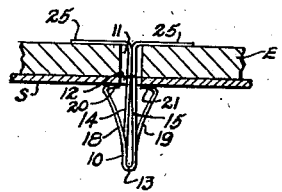
Fig. 1 is a sectional view through a supporting member and an element to be secured thereto, showing in elevation a spring clip retaining device of the present invention connecting the element to the supporting member.
Figure 2:
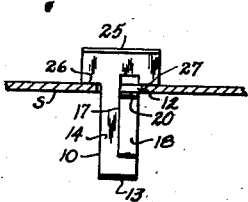
Fig. 2 is an end elevation of the device illustrated in Fig. 1.
Figure 3:
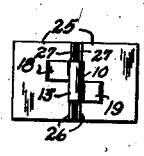
Fig. 3 is a bottom plan view of the device illustrated in Fig. 1.

A preferred form of locking spring clip retaining device having the above requirements and having additional specific advantages is illustrated in Figs. 1 to 3, inclusive, and comprises a spring clip 10 securing an element E to a supporting member S, by insertion of the clip through aligned apertures 11 and 12 in the element E and member S, respectively, and cooperation of the clip with the element and member adjacent the apertures. It is understood without illustration that the supporting member is usually provided with a plurality of apertures arranged in a row, corresponding apertures being provided in the element to be atached and aligned with those of the support respectively, each pair of aligned openings receiving one of the spring clips.

The locking spring clip devices illustrated in the accompanying drawing preferably are formed of a single flat strip of spring metal of suitable length, gauge, and resiliency, bent intermediate of its ends in the form of a rounded nose portion 13 from which extend laterally spaced leg portions 14 and 15, the rounded nose portion 13 and the leg portions 14 and 15 forming a substantially U-shaped shank.

In the form illustrated in Figs. 1 to 3, inclusive, the legs 14 and 15 are slit longitudinally, as indicated at 17, the material or stock between the slits and the outer edges of the legs being bowed outwardly from the plane of the legs and upwardly to provide oppositely disposed supplemental locking or gripping fingers 18 and 19. The free upper ends of the fingers 18 and 19 are bent inwardly at a comparatively abrupt angle to provide locking shoulders 20 and 21, respectively.

It will be noted that the slits 17 may be cut and the locking fingers and the locking shoulders may be formed by simple punching or forming operation and that the oppositely disposed locking fingers 18 and 19 and locking shoulders 20 and 21 are integral with the U-shaped shank.

The free ends of the legs 14 and 15 are bent outwardly from the plane of the shank portion to provide suitable spaced head portions 25. However, it is obvious that the head portions 25 may be shaped in any suitable or desirable form to accommodate a bead trim member, panelling or other element to be secured, the shape thereof being dependent upon the configuration of the element to be secured thereby. It will be noted that the width of the head portions 25 and of the portions of the legs adjacent to the head portions is greater than the remainder of the clip so as to provide land shoulders 26 and 27. The land shoulders 26 and 27, in those instances in which they are provided, position the device with the head portions in proper spaced relation to the supporting member S and also limit the distance the nose of the clip extends beyond the supporting member S. In some instances, the widening of the head portions and leg portions with the resultant land shoulders may be omitted.

The distance between the land shoulders 26 and 27 and the head portions is normally slightly less than the thickness of the element E so that the head portions 25 of the spring clip must be stressed into resilient engagement with the element E when the shoulders 26 and 27 engage the support. Thus the head portions yieldably urge the element against the supporting member S. In this manner the spring effect for securing the element E to the supporting member S is segregated from the shank portion, and results entirely from the head portions 25, and any undue stressing of the device occurring in either the shank portion 16 or the head portions 25 does not affect the gripping or retaining action of the other.

In installing the spring clip for securing the element E and member S together, the shank portion of the clip 10 may readily pass through the apertures in the element E and supporting member S by the compression of the locking fingers 18 and 19. After the device is fully inserted in the aperture the locking fingers 18 and 19 expand, causing the locking shoulders 20 and 21 to contact the face of the supporting member adjacent the aperture to lock the device securely and positively in place.

Due to the angular disposition of the locking shoulders 20 and 21, various thicknesses of material which comprise the supporting member are compensated for and the shoulders tend to cam the device toward the supporting member with constant yielding pressure when the device is installed and it is impossible to remove the device except by manual compression of the locking fingers 18 and 19 from the face of the supporting member opposite from the element to be secured thereto.

In those instances in which the shoulders extend partially into the projected area of the aperture in the support, as is illustrated in Fig. 1, no camming action tending to cam the fingers inwardly will result due to any outward pull on the clip. This results from the fact that the angle of the shoulders is sufficiently flat relative to the support that the shoulders will merely be more greatly compressed toward the nose of the clip by such a pull. It is apparent, however, from Fig. 1 that the clip illustrated may be inserted through an aperture of such size that when the fingers 18 and 19 re-expand the shoulders 20 and 21 will lie wholly outside of the projected area of the aperture.

Due to the resiliency of the locking fingers 18 and 19 and the shoulders 20 and 21, the element E to be secured and the spring clip device 10 are forced toward the supporting member S with constant tension and the element E is permanently held and locked in firm juxtaposition therewith.

Figure 4:
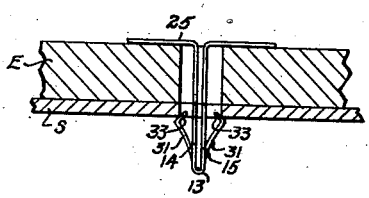
Fig. 4 is a front elevational view of a modified form of the spring clip retaining device.
Figure 5:
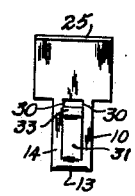
Fig. 5 is an end elevation of the same.
Figure 6:
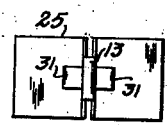
Fig. 6 is a bottom plan view of the device illustrated in Fig. 4.

The modified form of my spring clip shown in Figs. 4 to 6, inclusively, illustrates another manner in which a locking spring clip of this nature may be formed. In this modification the clip is formed similarly to the clip illustrated in Fig. 1 except that each of the leg portions 14 and 15 is provided with a pair of parallel longitudinal slits 30 spaced inwardly from its edges. The material between the slits of each leg is bowed outwardly to provide a locking finger 31 formed from the mid-portions of the associated leg. The end of the locking finger 31 then is bent inwardly to provide a locking shoulder 33. The spring clip illustrated in the modification is applied in the same manner as the spring clip illustrated in Fig. 1 and the locking shoulders 33 of the form shown in Fig. 4 correspond to the locking shoulders 20 and 21 of the device illustrated in Fig. 1 and will contact the margins of the support adjacent the aperture to securely lock the device firmly in place.

In Fig. 6 it will be noted that the fingers 31 are not offset parallel to the axis of curvature of the nose but occupy a common plane whereas in the form illustrated in Fig. 3 the locking fingers 18 and 19 are offset in a direction parallel to the axis of curvature of the nose and thus occupy different planes and are staggered with respect to each other.

Figure 7:
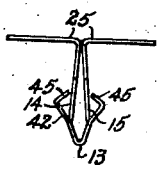
Fig. 7 is a front elevational view of another slightly modified form of the spring clip retaining device.
Figure 8:
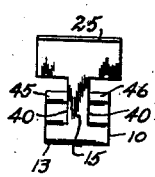
Fig. 8 is a side elevational view of the same.
Figure 9:
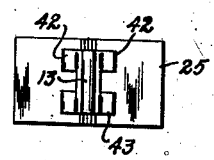
Fig. 9 is a bottom plan view of the device illustrated in Fig. 7.

Still another modification is illustrated in Fig. 7 and may be also formed similarly to the devices shown in Figs. 1 and 4 and possess the above mentioned desirable characteristics. In this form, each of the leg portions 14 and 15 is provided with a pair of parallel longitudinal slits 40 inset from the edges and spaced laterally from each other. The material or stock between the slits 40 and the outer edges of the shank portion are bowed upwardly to provide a plurality of locking fingers 42 and 43 on each leg, one at each side thereof. The ends of the locking fingers 42 and 43 are bent upwardly and inwardly to provide locking shoulders or holding portions 45 and 46. The spring clip device illustrated in this form is also applied in the same manner as the device illustrated in Fig. 1. However it will be more securely held in place due to the fact that each lateral margin of each leg portion is provided with a locking finger and a locking shoulder which contacts the material of the support which defines the aperture, and thus provides more contact and more uniformly distributed locking action.

Figure 10:
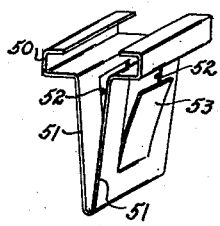
Fig. 10 is a perspective view of another modification.

Referring next to Fig. 10, there is illustrated a clip having different type of head portions 50 and leg portions 51 of the same width as the head portions so that no land shoulders are provided. Spaced slits 52 extending longitudinally of the legs are provided in each leg, the material between the slits being severed from the body of the leg at the upper end as in the clips heretofore described so as to provide locking fingers 53 on each leg. The upper ends of the locking fingers 53 are not formed into locking shoulders as heretofore described but the ends of the fingers themselves engage the supporting member and may slightly dig thereinto to provide tight and positive locking engagement.

In all of the forms illustrated, due to the fact that the fingers are formed of a portion of the material of the legs, the legs are more flexible at the portion between the land shoulders or head portions and the point of connection of the fingers with the legs than between the nose and said point of connection. Therefore, substantially all flexure of the legs occurs between the base of the fingers and the land shoulders so that the stressing cooperation between the legs and the head portions is isolated from the locking cooperation between the fingers and support. Consequently, pinching of the legs toward each other does not loosen or appreciably affect the locking action of the fingers.

It will be seen from the foregoing description that I have provided a simple, efficient and cheaply manufactured spring clip retaining device that can be easily and rapidly applied and one which will securely lock or anchor an element to a supporting member in firm juxtaposition without danger of its inadvertent removal. It is understood that various modifications and alterations may be made without departing from the spirit and scope of my invention.

Having thus described my invention, I claim:

1. A spring clip retaining device for securing an element to a support which has an aperture therein by insertion of the clip endwise through the aperture and comprising a strip of resilient metal having a portion in the form of a substantially U-shaped nose, and leg portions extending therefrom, said leg portions being of greater width at a part more remote from the nose than less remote from the nose, said wider portions providing land shoulders, said strip having a portion beyond the land shoulders in a direction away from the nose in the form of laterally extending head portions for attachment to the element to be secured to the support when the clip is inserted through said aperture, nose foremost, and said land shoulders being engageable with the face of the support against which the element is secured, and means connected to the leg portions of the clip near the nose portion and extending toward the head portions and engageable with the support at the face opposite to the element when the clip is installed, and said leg portions being more flexible between the shoulders and said means than at the widened portions and adjacent the nose.

2. A spring clip retaining device for securing an element to a support which has an aperture therein and comprising a strip of resilient metal having a portion in the form of a substantially U-shaped nose, leg portions extending therefrom, said leg portions being of greater width at a part remote from the nose than adjacent the nose, said wider portions providing land shoulders, and said strip having a portion beyond the land shoulders in a direction away from the nose in the form of laterally extending head portions for attachment to the element to be secured to the support when the clip is inserted through said aperture nose foremost, and said land shoulders being engageable with the face of the support against which the element is secured, and means on the leg portions of the clip engageable with the support at the face opposite to the element when the clip is installed, said means comprising a portion of the metal forming the leg portions partially separated from the remainder thereof and in the form of locking fingers flaring outwardly from the leg portions in a direction toward the head for engagement with the face of said support opposite from the element secured thereto.

3. A spring clip retaining device for securing an element to a support which has an aperture therein by insertion of the clip endwise through the aperture and comprising a strip of resilient metal having portions in the form of a head for attachment to the element to be secured to the support, and leg portions extending therefrom, said leg portions being of greater width at a part nearer the head than at a part farther from the head, said wider portions providing land shoulders for engagement with the face of the support to which the element is to be secured, said device being insertable endwise, legs foremost, through the aperture in the support and means connected to the leg portions of the device at a location spaced from the head and extending toward the head and being engageable with the support at the face opposite to the element when the clip is installed, and said leg portions being more flexible between the shoulders and said means than at the widened portions.

JOHN H. VAN UUM.